United States Patent [19]
Chibata et al.

[11] 3,865,726
[45] Feb. 11, 1975

[54] BLOOD UREA REMOVAL DEVICE

[75] Inventors: Ichiro Chibata, Suita; Tetsuya Tosa, Kyoto; Tadashi Sato, Takatsuki; Takao Mori, Suita, all of Japan

[73] Assignee: Tanabe Seiyaku Co., Ltd., Osaka-shi, Osaka-fu, Japan

[22] Filed: Oct. 5, 1973

[21] Appl. No.: 403,980

[30] Foreign Application Priority Data
Oct. 6, 1972  Japan.............................. 47-101005

[52] U.S. Cl.................... 210/152, 145/63, 210/202, 210/258, 210/259, 210/287, 210/321, 424/94
[51] Int. Cl............................................. B01d 31/00
[58] Field of Search ....... 210/22, 23, 259, 321, 152, 210/258, 287, 202; 195/1.8, 63; 424/94

[56] References Cited
UNITED STATES PATENTS
| | | | |
|---|---|---|---|
| 2,682,268 | 6/1954 | Ryan et al.................... | 210/DIG. 23 |
| 3,483,867 | 12/1969 | Markovitz........................ | 210/23 X |
| 3,522,346 | 7/1970 | Chang.............................. | 210/321 X |
| 3,608,729 | 9/1971 | Haselden ............................ | 210/321 |
| 3,617,545 | 11/1971 | Dubois et al.................... | 210/321 X |
| 3,669,878 | 6/1972 | Marantz et al.................. | 210/321 X |
| 3,669,880 | 6/1972 | Marantz et al.................. | 210/321 X |
| 3,794,584 | 2/1974 | Kunin................................ | 210/24 |

*Primary Examiner*—Frank A. Spear, Jr.
*Attorney, Agent, or Firm*—Wenderoth, Lind & Ponack

[57] ABSTRACT

A blood urea removal device which comprises a fluid passage having a blood inlet at one end and a blood outlet at both ends, a means for feeding a fumarate-containing solution and a column packed with an enzyme preparation provided in the passage, the enzyme preparation being microcapsules containing urease and/or aspartase in a membrane gel lattice of semi-permeable high polymeric substance.

4 Claims, 5 Drawing Figures

BLOOD UREA REMOVAL DEVICE

The present invention relates to a device for removal of blood urea. More particularly, it relates to a blood urea removal device capable of converting urea in the blood into aspartic acid by the aid of enzymes.

It is said that, when a man suffers from oliguria or suppression of urine due to the insufficiency of renal function, the waste metabolites such as urea in the body are retained in the blood, giving rise to a danger to life. In such case, the treatment with any medical material is often ineffective and, in order to eliminate the waste metabolites in the blood, blood exchange transfusion, perfusion to peritoneum, and use of artificial kidneys are effective. Among them, hemodialysis by the use of an artificial kidney is considered to be the most effective and is therefore frequently applied to many patients who suffer from renal failure.

Conventional hemodialysis devices purify the blood by transmitting the waste material in the blood through a semi-permeable dialysis membrance made of cellophane, nylon, vinyl chloride, polyethylene or the like into a dialysate by the utilization of a concentration gradient between the blood and the dialysate according to Donnan's membrane equilibrium law. However, a conventional dialysis membrane used for the device has a small dialysis capacity, so a large size device is necessary for an artificial kidney which requires the treatment of a large volume of blood. Attempts have been made to form the dialysis membrane in a tubular shape to assure a large contact area between the blood and the dialysis membrane so that the hemodialysis capacity is increased. In such case, however, the dialysis membrane is apt to break and its sterilization involves extreme difficulty.

In order to eliminate the waste metabolites, particularly urea, accumulated in the dialysate after the hemodialysis, various proposals including the adsorption of urea on active carbon or the action of urease on urea to decompose it into ammonia and carbon dioxide, followed by adsorption of the decomposed product on an ion exchange medium have been made. In the former proposal, however, a large amount of active carbon is necessary because of the small adsorption capacity of active carbon for urea. In the latter proposal, it is difficult to eliminate completely the ammonia which is formed in consequence of the urea decomposition and the product is toxic to living bodies. Thus, neither of them are practically applicable. In fact, the dialysate has been usually discarded. This is obviously uneconomical.

The present inventors noticed that urea can be decomposed by the action of urease into ammonia and carbon dioxide and also that ammonia and a fumarate can be converted into aspartic acid by the action of aspartase and they have attempted to utilize the enzymatic actions for elimination of urea by converting it effectively into aspartic acid, which is not toxic to living bodies and can be readily eliminated by the aid of an ion exchange resin or the like.

As a result of the extensive study, it has been found that, by enclosing the said enzymes, for example, in microcapsules and assembling the microcapsules in the blood flow passage of a blood urea removal device so as to allow the enzymes to directly contact the blood in the presence of a fumarate whereby the urea in the blood is converted into aspartic acid, which can be eliminated by the adsorption on an ion exchange resin, the device can be kept to a greatly reduced size. It has also been found that the dialysate from the dialyzer in a blood urea removal device can be repeatedly used by incorporating the microcapsules of the enzymes in the dialysate flow passage of the dialyzer and contacting the dialysate therewith in the presence of a fumarate so as to convert the urea therein into aspartic acid, which is then adsorbed on an ion exchange resin. The present invention is based on these findings.

According to the present invention, there is provided a blood urea removal device which comprises a fluid passage having a blood inlet at one end and a blood outlet at the other end, a means for feeding a fumarate-containing solution and a column packed with an enzyme preparation provided in the passage, the enzyme preparation being microcapsules containing urease and aspartase in a membrane or gel lattice of semi-permeable high polymeric substance.

There is also provided a blood urea removal device which comprises a fluid passage having a blood inlet at one end and a blood outlet at the other end, a means for feeding a fumarate-containing solution, a column packed with an enzyme preparation and a dialyzer provided in the passage, the dialyzer having a circulating passage provided with a column packed with an ion exchange resin and a circulation pump, the enzyme preparation being microcapsules containing urease and aspartase in a membrane or gel lattice of semi-permeable high polymeric substance.

There is further provided a blood urea removal device which comprises a fluid passage having a blood inlet at one end and a blood outlet at the other end and a dialyzer provided in the passage, the dialyzer being connected with a circulating passage having a means for feeding a fumarate-containing solution, a column packed with an enzyme preparation, a column packed with an ion exchange resin and a circulation pump, the enzyme preparation being microcapsules containing urease and aspartase in a membrane or gel lattice of semi-permeable high polymeric substance.

The enzyme preparation used in the blood urea removal device of this invention may be prepared, for instance, by polymerizing an acrylamide monomer in a solution containing urease and aspartase or encapsulating urease and aspartase with a semi-permeable film of nylon, polyurea or the like to make microcapsules. It may be also prepared by treating urease and aspartase with active carbon, kaolinite, an ion exchange resin (e.g., DEAE-cellulose, DEAE-Sephadex, decoloration ion exchange), a reactive polysaccharide (e.g., carboxymethyldextran azide, p-aminobenzylcellulose azide, bromoacetylcellulose), a reactive polymeric material (e.g., γ-(p-aminobenzoylamido)-propylsilane glass diazonium salt, p-aminophenylalanine-amino acid (e.g., glycine, leucine, alanine, copolymer diazonium salt) or an organic solvent (e.g., ethanol, acetone) so as to make it insoluble in water and then encapsulating it with an acrylamide polymer or a semi-permeable membrane to produce microcapsules.

The present invention will be hereinafter illustrated in greater detail in the accompanying drawings which show some embodiments of the blood urea removal device according to the invention, and in which.

Figure 1:
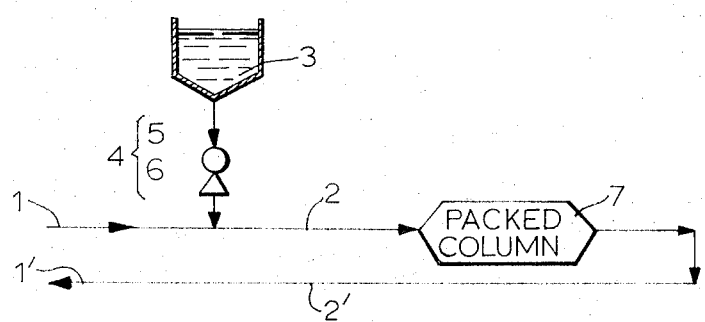
FIG. 1 is a flow diagram of an embodiment of the blood urea removal device according to the invention.

In FIG. 1 showing the flow diagram of an embodiment of the blood urea removal device of the invention, the blood inlet (1) and the blood outlet (1') may be respectively provided with a canula at the end portion to facilitate the connection with an artery or a vein. Or, they may be shaped at their end portions in such a form as capable of connecting to an artery or a vein with ease. The fluid passage tubes (2) and (2') are made of a material stable to and not denatured by blood such as silicone rubber, Teflon or polyethylene. The tank (3) is a storage for a solution containing a fumarate (e.g. sodium fumarate, potassium fumarate), which may further include an anticoagulant such as heparin to prevent the coagulation of blood during the urea removal process. The concentration of the fumarate in the solution may be appropriately varied with the content of urea in the blood and is usually from about 10 to 100 m mol. A means 4 is provided for feeding the fumarate-containing solution from the tank (3) to the fluid passage tube (2), which comprises a fumarate-containing solution feeding tube (5) made of the same material as the tube (2) and a pump (6) for supplying a suitable amount of the said solution to the tube (2), whereby the solution is incorporated into the blood. A column 7 is connected in the tubes 2 and 20' and is packed with an urease preparation and an aspartase preparation, an expanded sectional view of which is shown in FIG. 2.

Figure 2:
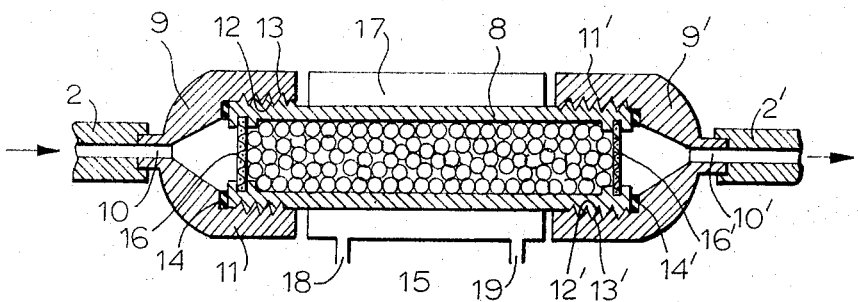
FIGS. 2 and 3 are longitudinal sectional views of packed columns of the device according to the invention.

In FIG. 2, the column (7) is made of a material stable to the blood such as a hard plastic (e.g., polycarbonate, polyacrylate) or glass, and has a cylinder 8 wherein the enzyme preparation is packed. At the respective ends of the cylinder (8), there are provided stoppers (9) and (9') which are freely detachable and have a blood inlet opening 10 and blood outlet opening 10', respectively, to which are connected the fluid passage tubes (2) and (2'). The female threads (12) and (12') provided around the inner peripheral surface of the skirt (11) of each of the stoppers (9) and (9') are in rigid contact with the male threads (13) and (13') provided around the outer peripheral surfaces of both end portions of the cylinder 8. Silicone rubber packings 14 and 14' are provided between the stoppers 9 and 9' and the ends of cylinder 8 so that no air is mixed into the column 7 during the passage of the blood therethrough. Such structure is of great convenience in that the enzyme preparation can be replaced with ease when the activity thereof is lowered. The portion (15) is to be filled with an urease preparation and an aspartase preparation. These enzyme preparations are held by the nylon net-like supporting means (16) and (16') across the ends of the cylinder 8 which have such fine meshes as to prevent these preparations from passing through. In the portion (15), the enzyme preparations are preferably arranged in such a manner that the urease preparation is positioned in the portion toward the blood inlet 10 opening and the aspartase preparation toward the blood outlet opening 10' or a mixture of the urease preparation and the aspartase preparation is toward the the blood inlet opening (10) and the aspartase preparation toward the blood outlet passage (10'). By these arrangements, it is assured that the urea in the blood is decomposed by the urease preparation into ammonia and carbon dioxide, and the resultant ammonia and the fumarate added to the blood are reacted in the presence of the aspartase preparation to give aspartic acid. The urea decomposition and the aspartic acid formation as described above take place at about 37°C. In order to maintain such temperature, it is preferable to provide the cylinder (8) with a heater (17). Between the heater (17) and the constant temperature bath (not shown), there are provided a warm water circulating pump (not shown) and fluid passage tubes 18 and 19 so that warm water of about 37°C can circulated through them, so that the said enzyme reactions can be favorably carried out.

Figure 3:
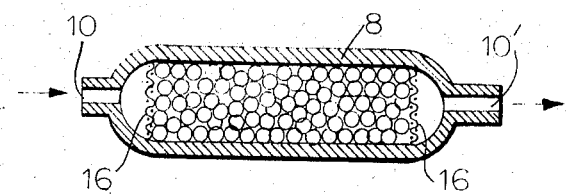

FIG. 3 shows an expanded sectional view of another embodiment of the column (7). The column of FIG. 3 is a so-called unit type which is fuse-sealed after being filled with the enzyme preparation and, when the enzymatic activity is lowered, may be discarded in its entirety.

Figure 4:
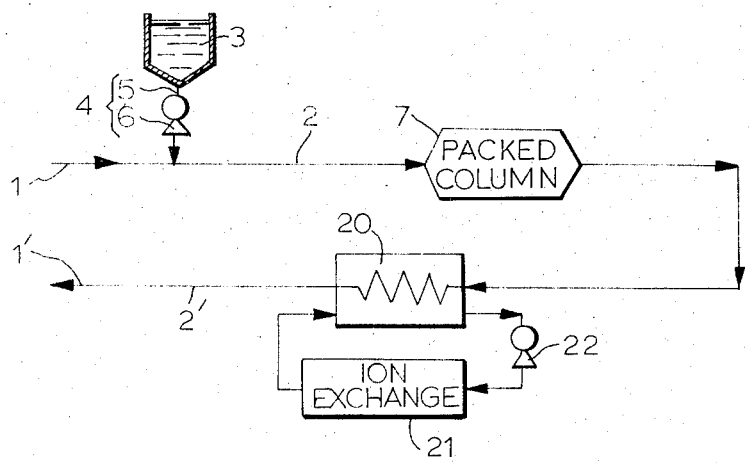
FIGS. 4 and 5 are flow diagrams of other embodiments of the device according to the invention.

FIG. 4 shows a flow diagram of another embodiment of the blood urea removal device of the invention. As compared to the device as shown in FIG. 1 which is intended only to convert urea into aspartic acid, the device as shown in FIG. 4 is so constructed as to make it possible to eliminate urea and other waste materials simultaneously. Thus, the device has a small-type dialyzer (20) following, i.e. downstream of the column (7) which is the same as the device shown in FIG. 1 and through one side of which the fluid passage from column 7 passes. A column 21 packed with an ion exchange resin such as a cation exchange resin (e.g., Amberlite IR-121, Dowex 50, Diaion SK-1), or an anion exchange resin (e.g. Amberlite IRA-400, Dowex 1, Diaion SA-100) is provided in the dialysate flow passage through the other side of the dialyzer 20 and a dialysate circulation pump 22 is provided in this flow passage. In this way, the urea in the blood is converted into aspartic acid by the column (7), and the aspartic acid and the waste materials other than urea are transmitted through the dialyzer (20) and adsorbed by an ion exchange resin column provided in the flow passage for the dialysate.

Figure 5:
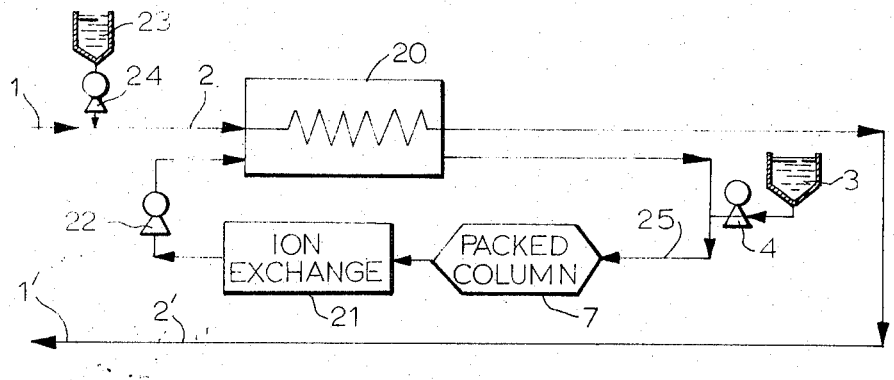

FIG. 5 shows a flow diagram of another embodiment of the blood urea removal device of the invention, which comprises the dialyzer (20), an anticoagulant, e.g. heparin storage tank (23) and the anticoagulant feeding pump (24). The dialysate flow passage 25 of the dialyzer is provided with the column (7) as in FIG. 2 or FIG. 3, the ion exchange resin column (21), the fumarate storage tank (3), the means (4) for feeding therefrom an appropriate amount of a fumarate-containing solution to the dialysate and the circulation pump (22). By the arrangement, the urea in the blood is transmitted into the dialysate through the dialysis membrane and converted into aspartic acid in the presence of the fumarate fed thereto and the enzyme in the column (7) disposed in the dialysate flow passage, and the thus produced aspartic acid is adsorbed by the ion exchange resin for ultimate elimination.

The dialyzer (20) employed in the blood urea removal device of the above second and third embodiments is the same in principle and construction as that used in a conventional blood urea removal device but, on account of the repeated use of the dialysate by circulation, is advantageous in appreciably reducing the expense thereof.

Since the blood urea removal device of this invention converts the urea in the blood into aspartic acid by the actions of urease and aspartase for elimination and the elimination effect is much greater than any conventional device using a dialysis membrane only, the size of the device can be markedly reduced. In addition, the amount of the dialysate used in the device of this invention is considerably smaller than that in a conventional device, and hence it is very economical.

Practical and presently preferred embodiments of the enzymatic preparations to be used in the invention are illustratively shown in the following Examples.

EXAMPLE 1

Crude aspartase obtained from *Escherichia coli* (60,000 units/g; 0.1 g) is dissolved in water (20 ml), triethylaminoethylcellulose (OH type, 6 ml) is added thereto, and the resultant mixture is stirred at 23°C for 1 hour. The precipitate is collected by filtration and washed with water to give immobilized aspartase (400 units/g; 3 g).

The obtained immobilized aspartase is suspended in 0.05 M phosphate buffer (pH 7.0; 8 ml) containing acrylamide (1.5 g) and N,N'-methylenebisacrylamide (0.08 g), and 5 percent β-dimethylaminopropionitrile solution (1 ml) and 1 percent potassium persulfate solution (1 ml) are added thereto. The resulting mixture is allowed to stand at 23°C for 30 minutes to give an immobilized aspartase preparation (77 units/g; 14 g).

EXAMPLE 2

Partially purified aspartase obtained from *Escherichia coli* (600,000 units/g; 0.02 g) is dissolved in water (10 ml), diethylaminoethyl-Sephadex (Cl type, 6 ml) is added thereto, and the resultant mixture is stirred at 23°C for 1 hour. The precipitate is collected by filtration and washed with water to give immobilized aspartase (800 units/g; 3 g).

The obtained immobilized aspartase is suspended in 0.05 M phosphate buffer (pH 8.5; 15 ml) containing 1,6-hexamethylenediamine (4 mmol), and the suspension is dispersed in a mixture of cyclohexane and chloroform (5 : 1, 100 ml). A solution of 2,4-toluenediisocyanate (7 mmol) in the same organic solvent mixture as above (75 ml) is dropwise added thereto at 4°C. The resulting mixture is stirred at the same temperature for 3 minutes, to form a polyurea film, by which immobilized aspartase is enclosed. The produced microcapsules are collected by filtration and washed with ethanol and water to give an immobilized aspartase preparation of 200 to 500 microns in particle diameter (67 units/g; 25 g).

EXAMPLE 3

Crude aspartase obtained from *Escherichia coli* (60,000 units/g; 0.1 g) is dissolved in water (20 ml), calcium phosphate gel (6 ml) is added thereto, and the resulting mixture is stirred at 23°C for 1 hour. The precipitate is collected by centrifugation and washed with water to give immobilized aspartase (150 units/g; 4 g). The obtained immobilized aspartase is treated as in Example 1 to give an immobilized aspartase preparation (21 units/g; 14.3 g).

EXAMPLE 4

Partially purified urease extracted from jack bean metal (800,000 units/g; 1 g) is dissolved in 0.1 M phosphate buffer (pH 7.7; 100 ml), saturated sodium chloride solution (5 ml) and ethanol (67 ml) are added thereto, and the resultant mixture is allowed to stand at 37°C for 60 minutes. The precipitate is collected by centrifugation and washed with water and 0.1 M phosphate buffer (pH 7.0) to give immobilized urease (1,600,000 units/g; 0.5 g).

The obtained immobilized urease is suspended in 0.1 M phosphate buffer (pH 7.0; 40 ml) containing acrylamide (7.5 g) and N,N'-methylenebisacrylamide (0.4 g), 5 percent dimethylaminopropionitrile solution (5 ml) and 1 percent potassium persulfate solution (5 ml) are added thereto, and the resultant mixture is allowed to stand at 23°C for 30 minutes to give an immobilized urease preparation (3,430 units/g; 70 g).

EXAMPLE 5

Partially purified urease extracted from jack bean meal (800,000 units/g; 0.1 g) is dissolved in 0.1 M phosphate buffer (pH 7.0; 10 ml), saturated sodium chloride solution (0.5 ml) and acetone (6.7 ml) are added thereto, and the resultant mixture is allowed to stand at 37°C for 30 minutes. The reaction mixture is treated as in Example 1 to give immobilized urease (1,600,000 units/g; 0.05 g).

The obtained immobilized urease is suspended in 0.2 M borate buffer (pH 8.5; 15 ml) containing casein (0.05 g) and 1,6-hexamethylenediamine (4 mmol). The suspension is emulsified in a mixture of cyclohexane and chloroform (5 : 1, 100 ml) containing 0.5 percent nonionic surfactant "Span 85" (v/v). The emulsion is cooled, and a solution of 2,4-toluenediisocyanate (7 mmol) in the same organic solvent mixture as above (75 ml) is dropwise added thereto. The resultant mixture is suspended at the same temperature for 3 minutes to form a semi-permeable polyurea film, by which immobilized urease is enclosed. The microcapsules are collected by filtration and washed with ethanol and water to give an immobilized urease preparation of 100 to 300 microns in particle diameter (960 units/g; 25 g).

EXAMPLE 6 p-Amino-DL-phenylalanine-L-leucine copolymer (molar ratio = 1 : 2.5) (1 g) is suspended in 0.5 M hydrochloric acid (30 ml), 0.5 M sodium nitrite solution (6 ml) is added thereto, and the resulting mixture is stirred at 4°C for 90 minutes to give the diazonium compound of the copolymer. The diazonium compound is washed with 0.1 M tris-sulfate buffer (pH 7.5) several times and suspended in the same buffer as above (40 ml). To the suspension, crystalline urease extracted from jack bean meal (8,000,000 units/g; 0.15 g) is added, and the resultant mixture is stirred at 4°C for 20 hours. Then, the mixture is subjected to centrifugation, and the precipitate is collected by filtration and washed with 0.1 M phosphate buffer (pH 7.0) to give immobilized urease (300,000 units/g; 2 g). The obtained immobilized urease is suspended in 0.1 M phosphate buffer (pH 7.0; 8 ml) containing acrylamide (1.5 g) and N,N'-methylenebisacrylamide (0.08 g), 5 percent β-dimethylaminopropionitrile solution (1 ml) and 1 percent potassium persulfate solution (1 ml) are added thereto, and the resultant mixture is treated as in Example 1 to give an immobilized urease preparation (34,000 units/g; 14 g).

EXAMPLE 7

Porous silica glass (40 to 80 mesh; 2 g) is suspended in a 10 percent solution of γ-aminopropyltriethoxysilane in toluene (100 ml), and the suspension is refluxed overnight. The resulting γ-aminopropylsilane glass (2 g) is suspended in anhydrous methanol (20 ml), p-nitrobenzoic acid (1 g) and N,N'-dicyclohexylcarbodiimide (2 g) are added thereto, and the resultant mixture is stirred at 23°C for 2 days. The obtained γ-(p-nitrobenzoylamido)-propylsilane glass (3 g) is suspended in water (500 ml), sodium dithionite (5 g) is added thereto, and the resultant mixture is heated for 30 minutes. The prepared γ-(p-aminobenzoylamido)-propylsilane glass (3 g) is suspended in 0.1 N hydrochloric acid (100 ml), sodium nitrite (500 mg) is added thereto, and the resulting mixture is stirred at 0°C for 120 minutes. The resultant diazonium compound of γ-benzoylamidopropylsilane glass (1 g) is suspended in 0.1 phosphate buffer (pH 7.5; 50 ml), crystalline urease extracted from jack bean meal (8,000,000 units/g; 0.02 g) is added thereto, and the resulting mixture is stirred at 4°C for 20 hours. The precipitate is collected by centrifugation and washed with the same buffer as above to give immobilized urease (16,000 units/g; 1 g).

The obtained immobilized urease is suspended in 0.2 M borate buffer (pH 8.5; 15 ml) containing 1,6-hexamethylenediamine (4 mmol), and the suspension is dispersed in a mixture of cyclohexane and chloroform (5 : 1, 100 ml). To the dispersion maintained at 4°C, a solution of sebacoyl chloride (4 mmol) in the same organic solvent mixture as above is dropwise added, and the resultant mixture is stirred for 3 minutes to form a semi-permeable nylon film, by which immobilized urease is enclosed. The produced microcapsules are collected by filtration and washed with ethanol and water to give an immobilized urease preparation of 200 to 500 microns in particle diameter (450 units/g; 25 g).

EXAMPLE 8

Crude aspartase obtained from *Escherichia coli* (60,000 units/g; 0.1 g), L-aspartic acid (0.3 g), acrylamide (0.75 g) and N,N'-methylenebisacrylamide (0.04 g) are dissolved in 0.1 M phosphate buffer (pH 7.0; 4 ml), 5 percent β-dimethylaminopropionitrile solution (0.5 ml) and 1 percent potassium persulfate solution (0.5 ml) are added thereto, and the resultant mixture is allowed to stand at 23°C for 30 minutes to give an immobilized aspartase preparation (200 units/g; 6 g).

EXAMPLE 9

0.2 M Borate buffer (pH 8.5; 15 ml) containing 1,6-hexamethylenediamine (4 mmol), partially purified urease extracted from jack bean meal (800,000 units/g; 0.1 g) and casein (0.05 g) are dispersed in a mixture of cyclohexane and chloroform (5 : 1, 100 ml) containing 0.5 percent nonionic surfactant "Span 85" (v/v). To the resultant emulsion maintained at 4°C, the same organic solvent mixture as above (75 ml) containing 2,4-toluenediisocyanate (7 mmol) is dropwise added thereto, and the resulting mixture is stirred at the same temperature for 3 minutes to give a semi-permeable polyurea film, by which the urease is enclosed. The produced microcapsules are collected by filtration and washed with ethanol and water to give an immobilized urease preparation of about 100 to 300 microns in particle diameter (620 units/g; 25 g).

What is claimed is:

1. A blood urea removal device which consists essentially of a fluid passage having an inlet at one end and an outlet at the other end, a column packed with an enzyme preparation in the passage, and a means for feeding a fumarate-containing solution connected to said fluid passage upstream of said column, the enzyme preparation being microcapsules containing urease in a membrane or gel lattice of semi-premeable high polymeric substance and microcapsules containing aspartase in a membrane or gel lattice of semi-permeable high polymeric substance.

2. A blood urea removal device as claimed in claim 1 in which the microcapsules containing urease are toward the upstream end of said column, and the microcapsules containing aspartase are toward the downstream end of said column.

3. A blood urea removal device as claimed in claim 1 further comprising a dialyzer in said fluid passage downstream of said column, the dialyzer having a dialysate circulating passage and a further column packed with ion exchange resin and a circulation pump in said dialysate circulating passage.

4. A blood urea removal device as claimed in claim 1 further comprising a dialyzer having a dialysate circulating passage, the inlet and outlet of said fluid passage being connected to said dialysate circulating passage for feeding solution through said dialyzer from said fluid passage and from said dialyzer back into said fluid passage, an ion exchange column packed with ion exchange resin connected in said fluid passage downstream of said column, and a circulation pump connected in the fluid passage.

* * * * *